Aug. 27, 1935.   C. A. CAMPBELL   2,012,375
AIR BRAKE
Filed June 9, 1932
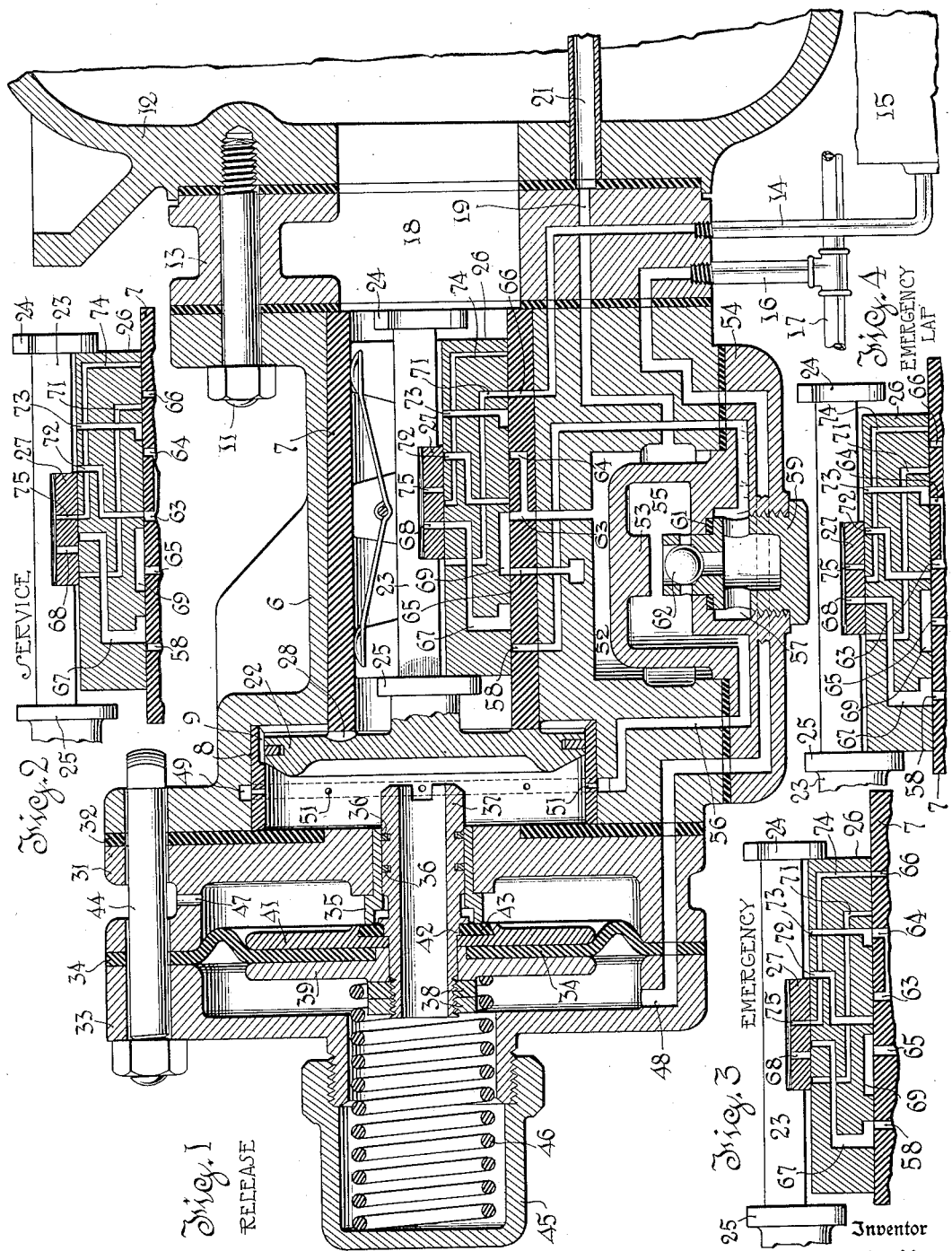
Inventor
Charles A. Campbell
By
Attorneys Patented Aug. 27, 1935

2,012,375

UNITED STATES PATENT OFFICE 2,012,375

AIR BRAKE

Charles A. Campbell, Watertown, N. Y., assignor to The New York Air Brake Company, a corporation of New Jersey Application June 9, 1932, Serial No. 616,327

27 Claims. (Cl. 303—66)

This invention relates to air brakes and particularly triple valves.

The prime object of the invention is to secure a more prompt release of the brakes after an emergency application, and to avail of air in the brake cylinder and in the auxiliary reservoir to assist in recharging the brake pipe.

A secondary feature, available where a supplemental reservoir is used, is the isolation of the supplemental reservoir while the brake cylinder and auxiliary reservoir are feeding back to the brake pipe, so that when the triple valve moves to release position, the supplemental reservoir will assist in recharging the auxiliary reservoir, the effect being to secure a partially charged and operative condition of the entire system at the earliest possible moment.

In a prior application, Serial No. 567,697, filed October 8, 1931, I describe and claim a device performing a similar sequence of operations. The present invention attains the desired results by much more simple means, the valve functions being performed by the triple valve itself.

Generally stated, I make use of a supplemental abutment which is actuated by brake pipe pressure in opposition to a lower pressure, preferably atmospheric pressure. Brake pipe pressure may, if desired, be assisted by a spring or other yielding means. The supplemental abutment positions a stop which, during service reductions of brake pipe pressure, arrests the triple piston in service position. Upon an emergency reduction of brake pipe pressure, auxiliary reservoir pressure acting against the triple piston, overpowers the stop and moves the triple piston to emergency position. Assuming that a supplemental reservoir is used, the supplemental reservoir, auxiliary reservoir and brake cylinder will equalize in emergency at a pressure dependent on their relative dimensions. When the engineer starts to increase brake pipe pressure to release an emergency application, and when brake pipe pressure reaches a definite value, decidedly lower than the equalized pressure just mentioned, the supplemental abutment, acting in concert with the triple piston, will shift the triple valve to an emergency lap position, in which the supplemental reservoir is isolated and the auxiliary reservoir and brake cylinder, which remain connected with each other, are placed in communication with the brake pipe through a check valve which permits flow toward the brake pipe and closes against flow in the reverse direction. Rapid equalization between the brake cylinder, auxiliary reservoir and brake pipe occurs, so that brake pipe pressure rises rapidly and releasing action once started proceeds rapidly through the entire train.

In the emergency lap position, the feed groove of the triple valve is closed so that continued rise of brake pipe pressure causes the triple valves to move to release position in which the brake cylinder is disconnected from the auxiliary reservoir and exhausted to atmosphere and the supplemental reservoir is connected with the auxiliary reservoir. The connection thus established is so dimensioned that the supplemental reservoir will assist in recharging the auxiliary reservoir without, however, causing the triple valve to return to application position.

The device operates to secure release of the brakes after an emergency application in a much shorter time than has been secured in practice heretofore. A part of the brake cylinder air is conserved and applied usefully in building up brake pipe pressure. Upon the completion of recharging flow from the supplemental reservoir, the system is partially charged to a degree sufficient to render it operative to apply the brakes.

The invention offers marked advantages, particularly in connection with long freight trains where the time of releasing an emergency application is unduly long with the present type of triple valve.

While the characteristics of the invention are such as to permit its embodiment in triple valves having many well known special functions, such as quick service of various known types, restricted recharge, retarded release, and in triple valves including secondary valve mechanisms designed to control the development of brake cylinder pressure in service and in emergency application, either or both, such functions are not involved in the emergency releasing operation to which the present invention is directed. Accordingly in the interests of a simple presentation of the invention, all such features are omitted, and the invention is described as embodied in a very simple triple valve. Its availability for use in the manner set forth is expressly recognized.

Such a simple embodiment of the invention is illustrated in the accompanying drawing, in which,—

Fig. 1 is a vertical axial section through a triple valve embodying the invention, the parts being illustrated in release position, and the valve being shown mounted by means of a filler piece on the rear end of an ordinary freight type auxiliary reservoir.

Fig. 2 is a fragmentary view similar to a portion of Fig. 1, showing the slide valve with its seat and graduating valve, and indicating the positions assumed by the valves in service application position.

Fig. 3 is a similar view showing the parts in emergency position.

Fig. 4 is a similar view showing the parts in emergency lap position.

The drawing is diagrammatic to the extent that the ports are drawn as if they all lay in a single plane, the purpose being to permit concurrent flows to be readily traced. In practice the ports would ordinarily not be located in a single plane, and they may be relocated within the scope of the invention, according to principles well understood by those skilled in the art.

The triple valve body, which may conveniently be an ordinary K-type body, is indicated at 6. It has the usual valve chamber bushing 7 and cylinder bushing 8, the bushing 8 being provided with the familiar feed groove 9. The body is flanged, as usual, and is connected by studs 11 with an ordinary freight type auxiliary reservoir 12, a filler piece 13 being interposed and offering a connection for the pipe 14 which leads from the supplemental reservoir 15, and for the branch pipe 16 which leads from the brake pipe 17.

The filler piece 13 is provided with a through passage 18 which leads from the slide valve chamber within the bushing 7 to the interior of the auxiliary reservoir 12. The filler piece is further provided with a through port 19 which leads to the brake cylinder pipe 21. The joints between the filler piece, on the one hand, and the triple valve body 6 and auxiliary reservoir 12, are sealed by ported gaskets, as usual.

The triple piston 22 works in the cylinder bushing 8 and is provided with a stem 23, which is guided by the usual spider 24. Between the spider 24 and a collar 25, the triple slide valve 26 is confined, a limited amount of lost motion being permitted. The valve 26 coacts with a seat formed in the bushing 7 and the graduating valve 27 is slidable on a seat formed on the upper face of the valve 26, the valve 27 being closely confined in a notch in the stem 23 so that the graduating valve moves relatively to the slide valve as a result of the lost motion permitted the slide valve. The graduating valve and slide valves are urged to their seats by the usual bow-springs, which are indicated in the drawing. In release position the piston 22 seats on the end of the bushing 7, a charging slot 28 being provided to permit charging flow.

Mounted on the outer end of the body 6 is a primary cap 31 which is sealed to the body 6 by a gasket 32, the gasket 32 projecting in far enough to serve also as a seat for the piston 22 in emergency position. A secondary cap 33 clamps the periphery of a flexible diaphragm 34 between it and the primary cap 31. The primary cap has a central aperture in which is pressed a guide bushing 35.

Slidable in the bushing 35 and sealed therein by means of snap rings 36, is a tubular longitudinally shiftable stop 37, designed to coact with the piston 22, and notched at its inner end to permit air flow when it engages the piston. The end of the slidable stop 37 is threaded to receive nuts 38 which clamp two abutment disks 39 and 41, upon the central portion of the diaphragm 34 and against the shoulder 42 formed on the stop member 37. A gasket 43 is provided to seal against the outer end of the guide bushing 35 when the stop member 37 is in its inner or right hand position. The body 6 and the caps 31 and 33, with the intervening diaphragm, are clamped together by bolts 44, one of which appears in the drawing. The secondary cap 33 has a central aperture closed by a threaded cap 45, and this serves as a seat for a coil compression spring 46, which encircles the nuts 38 and reacts against the abutment plate 37 to the right.

In this right hand position the gasket 43 seats against the bushing 35 and prevents any leakage from the space within the bushing 8 to the space to the right of diaphragm 34, which space is connected to atmosphere by the port 47. While the rings 36 offer reliable means for sealing against leakage, gasket 43 offers an additional seal under all service and release conditions.

When the member 37 is in its right hand position it will arrest the piston 22 in service position. The bore of the stop member 37 connects the space to the left of the piston 22 and the space to the left of the diaphragm 34, and these spaces are connected by a passage 48 which extends through the caps 33 and 31 and through the body 6 and filler piece 13 to the brake pipe branch 16. The bushing 8 is surrounded by a channel 49 and is provided with a plurality of ports 51 drilled through it and communicating with the channel 49. These ports are so located that in release position, service position and emergency lap position, they are to the left, that is, on the outer side of the piston 22, while in emergency position they are to the right, i. e., on the inner or auxiliary reservoir side of the piston 22.

Upon a service reduction of brake pipe pressure, the differential pressure upon the diaphragm 34, assisted by the spring 46, if used, is sufficient to insure arrest of the triple piston in service position. Upon an emergency reduction of brake pipe pressure, which may be a reduction to atmospheric pressure, and in any event is a reduction to a point lower than that attained in service, auxiliary reservoir pressure, acting on the piston 22, will overpower the diaphragm 34 and the spring 46, if this spring be used.

It may be stated at this point that the spring 46 may be omitted. If it is used the triple valve can be shifted to emergency lap position at a lower brake pipe pressure than is possible except by the use of a diaphragm 34 of excessive size. The spring can, however, be omitted and the diaphragm 34 can be made of any suitable area.

Mounted in the chamber 52, which will be recognized as the emergency piston chamber of the old K-triple valve, is a filler piece 53 having an integral flange 54, by means of which it is connected with the body 6. A ported gasket is interposed between the flange 54 and the body 6, and the parts are retained by threaded fastenings which are of conventional form and which are not shown in the drawing.

The body 53 is formed with two chambers, namely, chamber 55, which is connected by a passage 56 with the channel 49, and chamber 57, which is connected by a passage clearly shown in the drawing, with the feed back port 58 formed in the seat of the slide valve 26. The chambers communicate through a check valve assembly. A seat member 59 is threaded into the member 53 and makes a tight joint therewith by means of a gasket 61. A ball check valve 62 coacts with said seat. The construction is such as to permit flow from the seat port 58 past the check valve 62 to the channel 49 and consequently to the ports 51 in bushing 8. The check valve 62 closes against reverse flow. The construction shown is merely a convenient way of making use of conventional K-type triple valve bodies and any suitable port arrangement with check valve might be substituted. It will be observed that the port 48, already described, passes through a portion of the body 53.

An extension of the brake cylinder port 19 communicates with the interior of the chamber 52 and with this communicate the service port 63 and emergency port 64 formed in the seat of slide valve 26. There is an atmospheric exhaust port 65 also formed in the slide valve seat, and this port 65 may be controlled, and commonly would be controlled, by the usual retainer valve (not shown).

The supplemental reservoir pipe 14 communicates with a passage formed partly in the filler piece 13 and partly in the body 6 and leading to the supplemental reservoir port 66 in the seat of the slide valve 26, as clearly shown in the drawing.

The slide valve 26 is provided with a through port 67 which extends from the top to the bottom of the slide valve 26 and terminates on the lower face of the valve 26 in a longitudinal extension so dimensioned that when the slide valve is in emergency position (Fig. 3) and emergency lap position (Fig. 4) the port 67 communicates with the feed back port 58 already described. The upper end of the port is controlled by a port 68 which extends through the graduating valve 27 and which registers with the upper end of the port 67 when the graduating valve is in its inner or right hand position relatively to the slide valve 26. From this arrangement it follows that the port 67 registers with the port 58 in both emergency and emergency lap positions. When the graduating valve shifts toward lap it first closes the supplemental reservoir port 74 and then opens port 67.

The slide valve 26 is further provided with an exhaust cavity 69 in its lower face. This cavity functions only in release position (Fig. 1), at which time it connects the service port 63 with the exhaust port 65 and insures release of pressure from the brake cylinder. There is a supplemental reservoir port 71 which extends from the upper to the lower face of the slide valve 26. The port 71 is controlled by the outer (left hand) end of the graduating valve 27 and functions only in release position, at which time it registers with the supplemental reservoir port 66. There is a service port 72 which extends from the upper to the lower face of the slide valve 26 and is controlled by the inner (right hand) edge of the graduating valve 27. It functions only in service applications (Fig. 2) at which time it registers with the service port 63 and is controlled by the graduating valve 27.

There is an emergency port 73 which extends from the upper to the lower face of the slide valve 26 and is not controlled by the graduating valve. This port has at the lower face of the valve 26 a longitudinal extension which insures register of the port 73 and emergency port 64 in emergency and emergency lap positions. In emergency position (Fig. 3) it permits auxiliary reservoir air, and also supplemental reservoir air arriving through a port about to be described, to flow to the brake cylinder. In emergency lap position, which is the feed back position, it permits brake cylinder air to flow back to the slide valve chamber and thence pass through ports 68 and 67 to port 58 and thence past check valve 62, groove 49 and ports 51 to the space to the left of the piston 22, and thence to the brake pipe.

There is a port 74 which extends through the slide valve 26 from top to bottom, and this port is so located that it registers with the emergency reservoir port 66 when the slide valve 26 is in emergency position, at which time its upper end is exposed by a through port 75 in the graduating valve 27. Upon initial motion of the triple valve toward emergency lap position, the graduating valve closes the upper end of the port 74 and continued motion toward lap position of Fig. 4, moves the port 74 out of register with the supplemental reservoir port 66. In this way the supplemental reservoir is isolated by motion to emergency lap position, so that emergency reservoir pressure is held in reserve during the feed back function. Thus only the brake cylinder and auxiliary reservoir equalize with the brake pipe.

After such equalization the brake cylinder is exhausted and the supplemental reservoir is connected with the auxiliary reservoir. The first effect is back flow from the supplemental reservoir to the slide valve chamber and thence to the auxiliary reservoir, but the dimensions of port 71 and the graduating effect of the graduating valve 27, so regulate this back flow that auxiliary reservoir pressure will rise not much faster than brake pipe pressure, and consequently the tendency toward reapplication is minimized. The feature of thus controlling back flow from a supplemental reservoir to an auxiliary reservoir to prevent reapplication of the brakes, forms the subject matter of my prior application Serial No. 517,604, filed February 21, 1931, and consequently is not claimed herein except in combination with the feed back mechanism forming the subject of the present application.

*Operation*

The functions of the various parts have been described in connection with the detailed description, and consequently only a general statement of operation is considered to be necessary.

*Release*

In release the diaphragm 34 will move to the right and the triple piston 22 will move to the right, the parts assuming the position shown in Fig. 1, in which the brake cylinder will be exhausted to atmosphere. The auxiliary reservoir will be charged through the feed groove 9 and slot 28. The supplemental reservoir will be charged through port 71. Since the valve does not draw upon the supplemental reservoir in service, the supplemental reservoir will assist in recharging the auxiliary reservoir during the initial part of recharge following service, and will then be charged concurrently with the auxiliary reservoir until both reservoirs attain their fully charged condition.

*Service application*

Upon a service reduction of brake pipe pressure, the diaphragm 34 retains the stop 37 in its right hand position so that this arrests the triple piston 22 in service position. Under these conditions the slide valve and graduating valve assume the position shown in Fig. 2. The exhaust connection from the brake cylinder is interrupted and auxiliary reservoir air feeds to the brake cylinder through the port 72, the flow being graduated by the valve 27. When auxiliary reservoir pressure falls slightly below brake pipe pressure the graduating valve will terminate the service flow to the brake cylinder.

Emergency

If the engineer reduces brake pipe pressure at an emergency rate, the triple piston 22 will be forced to its left hand position against gasket 32. This action occurs for the reason that auxiliary reservoir pressure will be sufficient to overpower the brake pipe pressure acting on the diaphragm and on the triple piston, and also the spring 46, if such spring be used. The slide valve and graduating valve assume the positions illustrated in Fig. 3, in which the supplemental reservoir supplies air to the slide valve chamber through the ports 74 and 75, and this air, together with auxiliary reservoir air, flows to the brake cylinder through the ports 73 and 64.

Release following emergency

When the engineer starts to raise brake pipe pressure following such an emergency application, the increasing pressure will act on the diaphragm 34 in opposition to atmospheric pressure and on the triple piston 22 in opposition to the equalized pressure attained in emergency by the connection of the brake cylinder and both reservoirs. Before brake pipe pressure attains such equalized pressure, and preferably at a very much lower value, the triple valve will start toward emergency lap position.

The first effect of such motion is to shift the graduating valve 27 on the slide valve 26, thus blanking the upper end of the port 74 and isolating the supplemental reservoir, and then connecting the port 67 with the slide valve chamber. This occurs before the slide valve 26 moves at all, so that initial motion of the graduating valve isolates the supplemental reservoir and connects the brake cylinder and the auxiliary reservoir through the ports 63 and 67, and port 58 with the channel 49. Therefore, as soon as the piston 22 passes to the right of the port 51, which it does in the early portion of its motion, flow from the auxiliary reservoir and the brake cylinder will commence. This flow takes place as the valve moves to the emergency lap position of Fig. 4, in which position the slide valve itself blanks port 66. The triple valve stops in emergency lap position, since at this point gasket 43 seats on rim 35 and diaphragm 34 ceases to assist piston 22. No further movement takes place until brake pipe pressure rises above pressure in the slide valve chamber.

The effect of feed back flow is to produce a rapid equalization between the auxiliary reservoir and brake cylinder, on the one hand, and the brake pipe on the other, the brake pipe pressure rising rapidly. Consequently, as each triple valve moves to emergency lap position, it assists in building up brake pipe pressure, and thus causing other valves to move to emergency lap position. Thus all valves in a train move promptly to emergency lap position. In such position the feed grooves are not open. Consequently the brake pipe is not drawn upon for charging air at any point and the check valve 62 prevents any back flow through the feed back connection.

It follows that brake pipe pressure continues to rise and passes above the pressures in the slide valve chambers, with the result that the triple valves shift to the release position of Fig. 1. By such shift the brake cylinder is disconnected from the auxiliary reservoir and exhausted, and at the completion of the releasing motion of the triple valves the supplemental reservoir is connected with the slide valve chamber. Equalization of pressure between the two reservoirs thus results in further charging of the auxiliary reservoir. As explained, this occurs under conditions which preclude undesired reapplication.

General considerations

The feed back arrangement above described is of the utmost simplicity since it involves merely coacting ports in the slide valve seat, slide valve and graduating valve, a check valve and certain ports in the cylinder bushing, in conjunction with some means responsive to brake pipe pressure and effective to assist in moving the triple piston from emergency position to emergency lap position.

While under certain conditions it might be possible to use a spring actuated stop similar to a graduating stem, in lieu of the diaphragm stop structure illustrated, this arrangement is not considered completely safe. Because of brake pipe leakage, the reservoirs throughout the length of a long train are seldom charged to a uniform pressure, and it is always possible for an engineer to start an emergency application while the reservoirs, or some of them, are partially charged. If a spring stop sufficiently powerful to secure the desired feed back action were used, there would be serious danger that at times and under certain conditions, it would allow some of the triple valves to move to emergency position and then graduate them back to feed back position. Consequently, a structure using a pressure actuated abutment which is rendered substantially or completely ineffective when brake pipe pressure is reduced in emergency, has important advantages.

The auxiliary abutment or diaphragm used is protected against leakage under emergency releasing conditions by the rings 36, and under all service, service lap and release conditions, a further seal is afforded by the gasket 43.

Check valve 62 protects the triple valve against any interference with its normal releasing functions after the feed back has occurred. While a very simple check valve has been indicated, there is nothing inherent in the invention which would exclude the use of more elaborate check valve mechanisms, if considered necessary.

The possibility of omitting the spring 46 has been suggested. Where entire trains would be equipped with the device, it is preferable to use the spring because with a diaphragm of moderate size it becomes possible to initiate the feed back action at a lower brake pipe pressure. The strength of such a spring when assisted by a diaphragm is low enough to avoid any danger of unintended motion from emergency position to feed back position. On the other hand, if valves embodying the feed back mechanism here disclosed, are to be used mixed in trains with valves of the present K-type, it is preferable to omit the spring.

The valve disclosed in the present application is intended to be used with an emergency brake pipe vent valve which responds to an emergency reduction of brake pipe pressure to vent the brake pipe on each car adjacent the triple valve. When triple valves used with vent valves of this type are mixed with K-type triple valves in a train, the effect of the emergency venting action characteristic of the K-triple valve is to cause the independent vent valves associated with the feed back valves to close sooner than otherwise they would. The result is the retention in the brake pipe of rather high pressures and increased risk of some feed back valve shifting to feed back position. When it is known that no K-triple valves will be connected in a train, or when a very moderate number will be so connected, the spring can be safely used.

Another feature of importance whenever valves of the present type are to be used connected in trains with K-type triple valves, has to do with the releasing function of the K-triples. The effective area of the diaphragm and the strength of the spring coacting therewith, are so coordinated that when the triple piston shifts to feed back position (emergency lap position) and then to release position, the pressure attained in the auxiliary reservoir, as the result of back flow from the supplemental reservoir, will slightly exceed the brake pipe pressure necessary to release the K-triple valves (usually about 57 pounds when operating with a brake pipe pressure of 70 pounds). The effect is to cause the feed back triple valves not to draw upon the brake pipe for charging air, so that rising brake pipe pressure will release the K-triples while the pressures in the two reservoirs on the feed back valves are equalizing. A markedly improved releasing action of the K-triple valves results.

The availability of the use of the feed back mechanism here illustrated, or approximate equivalents thereof, in connection with triple valves having the special functions already enumerated, and not specifically embodied in the drawing, is recognized.

While I prefer to use the flexible diaphragm 34, various types of movable abutments operated by pressure differentials are known, and might be substituted, if preferred. Consequently no limitations to the specific construction illustrated in the drawing are implied. The scope of the invention is defined in the claims.

What is claimed is,—

1. In a triple valve, the combination of a body adapted for connection with a brake pipe, an auxiliary reservoir and a brake cylinder; a triple piston; a slide valve and coacting graduating valve arranged to be actuated by said piston, said valves having service, emergency and release positions, and an emergency lap position, in which last they establish a feed back passage from the brake cylinder and auxiliary reservoir to the brake pipe; and a yielding stop normally serving to arrest the triple valve in service position but capable of yielding to permit it to move to emergency position, said stop serving on partial restoration of brake pipe pressure after emergency, to shift the triple valve to said emergency lap position.

2. The combination of claim 1, further characterized in that said triple piston also controls the feed back passage and obstructs the same in emergency position.

3. The combination of claim 1, further characterized in that said triple piston also controls the feed back passage, and in emergency position both the piston and the graduating valve interrupt said passage while the slide valve does not, whereby on motion from emergency position toward lap the graduating valve and piston open the feed back passage before the slide valve is moved.

4. In a triple valve, the combination of a body adapted for connection with a brake pipe, an auxiliary reservoir and a brake cylinder; a triple piston; a slide valve and coacting graduating valve arranged to be actuated by said piston, said valves having the usual service, emergency and release positions, and an emergency lap position, in which last they establish a feed back passage from the brake cylinder and auxiliary reservoir to the brake pipe; and a shifting stop mechanism normally sustained at least in part by brake pipe pressure, serving to arrest the triple valve in service position, to yield upon depletion of brake pipe pressure in emergency reductions to permit the triple valve to move to emergency position, and to assist in shifting the triple valve to emergency lap position upon a partial restoration of brake pipe pressure after an emergency application.

5. The combination of claim 4, further characterized in that said triple piston also controls the feed back passage and obstructs the same in emergency position.

6. In a triple valve, the combination of a body adapted for connection with a brake pipe, an auxiliary reservoir, a supplemental reservoir and a brake cylinder; a triple piston; a slide valve and coacting graduating valve arranged to be actuated by said piston, said valves having the usual service and release positions, an emergency position in which they connect both reservoirs with the brake cylinder, and an emergency lap position in which they isolate one reservoir and establish a feed back passage from the brake cylinder and the other reservoir to the brake pipe; and a yielding stop normally serving to arrest the triple valve in service position but capable of yielding to permit it to move to emergency position, said stop serving on partial restoration of brake pipe pressure after emergency to shift the triple valve to said emergency lap position.

7. The combination of claim 6, further characterized in that the slide valve has lost motion relatively to the graduating valve and triple piston, and the ports in said valves are so arranged that as the piston and graduating valve move from emergency toward emergency lap position and before the slide valve is moved, the graduating valve first isolates the supplemental reservoir and then establishes the feed back passage.

8. The combination of claim 6, further characterized in that the slide valve has lost motion relatively to the graduating valve and triple piston, and the ports in said valves are so arranged that as the piston and graduating valve move from emergency toward emergency lap position and before the slide valve is moved, the graduating valve first isolates the supplemental reservoir and then establishes the feed back passage, and thereafter the slide valve moves with the graduating valve to emergency lap position in which it isolates the supplemental reservoir independently of the graduating valve while maintaining the feed back passage open.

9. The combination of claim 6, further characterized in that the triple piston obstructs said feed back passage in emergency position and the slide valve has lost motion relatively to the graduating valve and triple piston, and the ports in said valves are so arranged that as the piston and graduating valve move from emergency toward emergency lap position and before the slide valve is moved, the graduating valve first isolates the supplemental reservoir and then establishes the feed back passage.

10. In a triple valve, the combination of a body adapted for connection with a brake pipe, an auxiliary reservoir, a supplemental reservoir and a brake cylinder; a triple piston; a slide valve and coacting graduating valve arranged to be actuated by said piston, said valves having service and release positions, an emergency position in which they connect both reservoirs with the brake cylinder and an emergency lap position in which they isolate one reservoir and establish a feed back passage from the brake cylinder and the other reservoir to the brake pipe; and a shifting stop mechanism normally sustained at least in part by brake pipe pressure, serving to arrest the triple valve in service position, to yield upon depletion of brake pipe pressure in emergency reductions to permit the triple valve to move to emergency position, and to assist in shifting the triple valve to emergency lap position upon a partial restoration of brake pipe pressure after an emergency application.

11. The combination of claim 10, further characterized in that the slide valve has lost motion relatively to the graduating valve and triple piston, and the ports in said valves are so arranged that as the piston and graduating valve move from emergency toward emergency lap position and before the slide valve is moved, the graduating valve first isolates the supplemental reservoir and then establishes the feed back passage.

12. The combination of claim 10, further characterized in that the slide valve has lost motion relatively to the graduating valve and triple piston, and the ports in said valves are so arranged that as the piston and graduating valve move from emergency toward emergency lap position and before the slide valve is moved, the graduating valve first isolates the supplemental reservoir and then establishes the feed back passage, and thereafter the slide valve moves with the graduating valve to emergency lap position in which it isolates the supplemental reservoir independently of the graduating valve while maintaining the feed back passage open.

13. The combination of claim 10, further characterized in that the triple piston obstructs said feed back passage in emergency position and the slide valve has lost motion relatively to the graduating valve and triple piston, and the ports in said valves are so arranged that as the piston and graduating valve move from emergency toward emergency lap position and before the slide valve is moved, the graduating valve first isolates the supplemental reservoir and then establishes the feed back passage.

14. The combination of a triple valve having release, service and emergency positions and an emergency lap position in which it serves to feed air back to the brake pipe; a shiftable stop for the triple valve having a normal position in which it acts to arrest the triple valve in service position and to which it returns after recession therefrom in emergency to shift the triple valve to emergency lap position; and a movable abutment connected with said stop to shift the same, said abutment being subject to brake pipe pressure urging the stop toward said normal position.

15. The combination of a triple valve having release, service and emergency positions and an emergency lap position in which it serves to feed air back to the brake pipe; a shiftable stop for the triple valve having a normal position in which it acts to arrest the triple valve in service position and to which it returns after recession therefrom in emergency to shift the triple valve to emergency lap position; a movable abutment connected with said stop to shift the same, said abutment being subject to brake pipe pressure urging the stop toward said normal position; and a spring acting to assist brake pipe pressure in its action on said abutment.

16. The combination of a triple valve having release, service and emergency positions and an emergency lap position in which it isolates a supplemental reservoir connection, and serves to bring brake cylinder and auxiliary reservoir connections into feeding communication with a brake pipe connection; a shiftable stop for the triple valve having a normal position in which it acts to arrest the triple valve in service position and to which it returns after recession therefrom in emergency to shift the triple valve to emergency lap position; and a movable abutment connected with said stop to shift the same, said abutment being subject to brake pipe pressure urging the stop toward said normal position.

17. The combination of a triple valve having release, service and emergency positions and an emergency lap position in which it isolates a supplemental reservoir connection, and serves to bring brake cylinder and auxiliary reservoir connections into feeding communication with a brake pipe connection; a shiftable stop for the triple valve having a normal position in which it acts to arrest the triple valve in service position and to which it returns after recession therefrom in emergency to shift the triple valve to emergency lap position; a movable abutment connected with said stop to shift the same, said abutment being subject to brake pipe pressure urging the stop toward said normal position; and a spring acting to assist brake pipe pressure in its action on said abutment.

18. The combination of a brake pipe; a brake cylinder; an auxiliary reservoir; a supplemental reservoir; a triple valve connected thereto and having an emergency lap position in which it isolates the supplemental reservoir and connects brake cylinder and auxiliary reservoir in feeding relation to the brake pipe, and a release position to which it is moved by preponderance of brake pipe over auxiliary reservoir pressure and in which the supplemental reservoir is connected to charge the auxiliary reservoir; and means for so controlling such charging flow that auxiliary reservoir pressure slightly exceeds brake pipe pressure while being so charged, whereby brake pipe pressure is conserved and releasing movement of adjacent triple valves is facilitated.

19. The combination of a brake pipe; a brake cylinder; an auxiliary reservoir; a supplemental reservoir; a triple valve connected thereto and having an emergency lap position in which it isolates the supplemental reservoir and connects brake cylinder and auxiliary reservoir in feeding relation to the brake pipe, and a release position to which it is moved by preponderance of brake pipe over auxiliary reservoir pressure and in which the supplemental reservoir is connected to charge the auxiliary reservoir; means for so controlling such charging flow that auxiliary reservoir pressure slightly exceeds brake pipe pressure while being so charged, whereby brake pipe pressure is conserved and releasing movement of adjacent triple valves is facilitated; and stop means actuated at least in part by brake pipe pressure for controlling the motion of the triple valve to service and emergency positions, and for restoring the triple valve from emergency to emergency lap position.

20. The combination of a brake pipe; a brake cylinder; an auxiliary reservoir; a supplemental reservoir; a triple valve connected thereto and having an emergency lap position in which it isolates the supplemental reservoir and connects brake cylinder and auxiliary reservoir in feedback relation to the brake pipe, and a release position to which it is moved by preponderance of brake pipe pressure over auxiliary reservoir pressure and in which the supplemental reservoir is connected to charge the auxiliary reservoir; and a pressure actuated abutment for controlling the motion of the triple valve to service and to emergency positions and for assisting in restoring the triple valve from emergency to emergency lap position, the area of said abutment being so chosen, that after the triple valve has been moved to emergency lap position, the auxiliary reservoir pressure will equalize with the brake pipe pressure at a value high enough to insure equalization with the supplemental reservoir, upon the final movement of the triple valve to release position, at a value at least as high as the brake pipe pressure necessary to release adjacent triple valves in the train.

21. The combination of a brake pipe; a brake cylinder; an auxiliary reservoir; a supplemental reservoir; a triple valve connected thereto and having an emergency lap position in which it isolates the supplemental reservoir and connects brake cylinder and auxiliary reservoir in feedback relation to the brake pipe, and a release position to which it is moved by preponderance of brake pipe pressure over auxiliary reservoir pressure and in which the supplemental reservoir is connected to charge the auxiliary reservoir; and a pressure actuated abutment and an assisting spring for controlling the motion of the triple valve to service and to emergency positions and for restoring the triple valve from emergency to emergency lap position, the area of said abutment, the strength of said spring, being so chosen, that after the triple valve has been moved to emergency lap position, the auxiliary reservoir pressure will equalize with the brake pipe pressure at a value high enough to insure equalization with the supplemental reservoir, upon the final movement of the triple valve to release position, at a value at least as high as the brake pipe pressure necessary to release adjacent triple valves in the train.

22. The combination of a triple valve having an emergency position in which flow from the auxiliary reservoir to the brake pipe is precluded, and an emergency lap position in which a feed back connection is established from the auxiliary reservoir to the brake pipe; and means rendered effective by a moderate rise of brake pipe pressure after an emergency reduction thereof to shift said valve from emergency to emergency lap position.

23. The combination of claim 22, in which the triple valve includes a triple piston and said piston controls the feed back passage and obstructs the same in emergency position.

24. The combination of a triple valve having an emergency position in which flow from the auxiliary reservoir to the brake pipe is precluded, and an emergency lap position in which a feed back connection is established from the auxiliary reservoir to the brake pipe; and means comprising a supplemental abutment actuated at least in part by brake pipe pressure and assisting to shift said triple valve from emergency to emergency lap position upon a moderate rise of brake pipe pressure after an emergency reduction thereof.

25. The combination of claim 24 in which the triple valve includes a triple piston, and said piston controls the feed back passage and obstructs the same in emergency position.

26. The combination of a triple valve having an emergency position in which it connects the auxiliary reservoir and a supplemental reservoir with the brake cylinder, and isolates them from the brake pipe, and an emergency lap position in which it isolates the supplemental reservoir and establishes a feed back connection from the auxiliary reservoir to the brake pipe; and means rendered effective by a moderate rise of brake pipe pressure after an emergency reduction thereof, to shift said triple valve from emergency to emergency lap position.

27. The combination of claim 26, in which the triple valve includes a triple piston which controls the feed back passage and obstructs the same in emergency position.

CHARLES A. CAMPBELL.